US012593302B1

(12) United States Patent
Wichgers

(10) Patent No.: US 12,593,302 B1
(45) Date of Patent: Mar. 31, 2026

(54) NODE CONFIGURED TO DETERMINE OWNSHIP POSITION INFORMATION AND/OR OWNSHIP TIME INFORMATION WITHOUT TRANSMITTING TWO-WAY TIMING AND RANGING (TWTR) SIGNALS

(71) Applicant: Rockwell Collins, Inc., Cedar Rapids, IA (US)

(72) Inventor: Joel M. Wichgers, Urbana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 285 days.

(21) Appl. No.: 18/388,670

(22) Filed: Nov. 10, 2023

(51) Int. Cl.
*H04W 64/00* (2009.01)
*G01S 13/87* (2006.01)

(52) U.S. Cl.
CPC ........... *H04W 64/00* (2013.01); *G01S 13/876* (2013.01)

(58) Field of Classification Search
CPC .............................. H04W 64/00; G01S 13/876
See application file for complete search history.

(56) References Cited

U.S. PATENT DOCUMENTS

| | | | |
|---|---|---|---|
| 3,796,989 | A | 3/1974 | Johnston et al. |
| 8,599,956 | B1 | 12/2013 | Mitchell |
| 9,883,348 | B1 | 1/2018 | Walker et al. |
| 10,194,269 | B2 | 1/2019 | Venkataraman et al. |
| 10,281,560 | B2 | 5/2019 | Xue et al. |
| 10,568,064 | B2 | 2/2020 | Seth et al. |
| 10,948,566 | B1 | 3/2021 | Harbin et al. |
| 11,280,874 | B2 | 3/2022 | Fortney |
| 11,280,896 | B2 | 3/2022 | Hawker et al. |
| 11,412,347 | B2 | 8/2022 | Demirdag et al. |
| 11,665,658 | B1 | 5/2023 | Sorsby et al. |
| 2012/0086596 | A1 | 4/2012 | Insanic et al. |
| 2016/0118716 | A1 | 4/2016 | Stephenne et al. |
| 2021/0088622 | A1 | 3/2021 | Nishimoto |
| 2021/0255333 | A1 | 8/2021 | Sornin et al. |
| 2022/0365165 | A1* | 11/2022 | Kirchner ................. G01S 19/47 |
| 2023/0009717 | A1 | 1/2023 | Bilstad et al. |
| 2023/0118390 | A1 | 4/2023 | Ninos et al. |
| 2023/0229175 | A1 | 7/2023 | Squillace et al. |

FOREIGN PATENT DOCUMENTS

| | | |
|---|---|---|
| EP | 2988146 A1 | 2/2016 |
| EP | 3273271 B1 | 6/2023 |
| GB | 2542491 A | 3/2017 |
| WO | 2022106139 A3 | 5/2022 |
| WO | 2022155436 A1 | 7/2022 |
| WO | 2022221429 A1 | 10/2022 |
| WO | 2022226233 A1 | 10/2022 |
| WO | 2023096950 A1 | 6/2023 |

* cited by examiner

*Primary Examiner* — Curtis B Odom

(74) *Attorney, Agent, or Firm* — Suiter Swantz IP

(57) ABSTRACT

A system includes a node configured to: listen to a first two-way timing and ranging (TWTR) interrogation message and a first TWTR response message communicated between a first node pair during a first time interval; determine a first time difference of arrival (TDoA) between the first TWTR interrogation message and the first TWTR response message; determine a first boundary of position (BoP); and based at least on the first BoP, determine position information and/or time information of the node without the node transmitting any TWTR interrogation message or any TWTR response message.

20 Claims, 8 Drawing Sheets

102-A/B/C/D

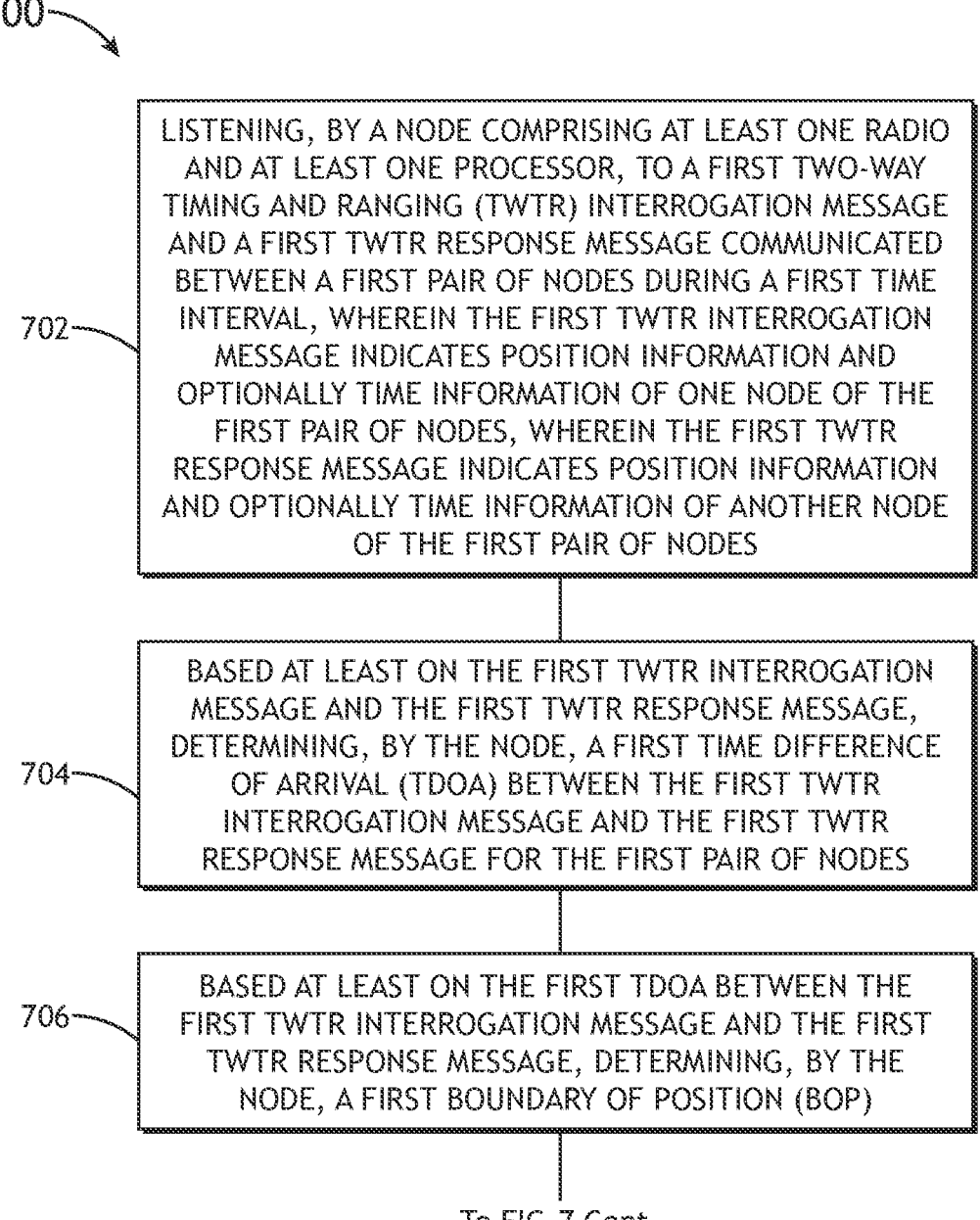

700

702 — LISTENING, BY A NODE COMPRISING AT LEAST ONE RADIO AND AT LEAST ONE PROCESSOR, TO A FIRST TWO-WAY TIMING AND RANGING (TWTR) INTERROGATION MESSAGE AND A FIRST TWTR RESPONSE MESSAGE COMMUNICATED BETWEEN A FIRST PAIR OF NODES DURING A FIRST TIME INTERVAL, WHEREIN THE FIRST TWTR INTERROGATION MESSAGE INDICATES POSITION INFORMATION AND OPTIONALLY TIME INFORMATION OF ONE NODE OF THE FIRST PAIR OF NODES, WHEREIN THE FIRST TWTR RESPONSE MESSAGE INDICATES POSITION INFORMATION AND OPTIONALLY TIME INFORMATION OF ANOTHER NODE OF THE FIRST PAIR OF NODES

704 — BASED AT LEAST ON THE FIRST TWTR INTERROGATION MESSAGE AND THE FIRST TWTR RESPONSE MESSAGE, DETERMINING, BY THE NODE, A FIRST TIME DIFFERENCE OF ARRIVAL (TDOA) BETWEEN THE FIRST TWTR INTERROGATION MESSAGE AND THE FIRST TWTR RESPONSE MESSAGE FOR THE FIRST PAIR OF NODES

706 — BASED AT LEAST ON THE FIRST TDOA BETWEEN THE FIRST TWTR INTERROGATION MESSAGE AND THE FIRST TWTR RESPONSE MESSAGE, DETERMINING, BY THE NODE, A FIRST BOUNDARY OF POSITION (BOP)

From FIG.7

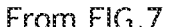

708 — BASED AT LEAST ON THE FIRST BOP, DETERMINING, BY THE NODE, POSITION INFORMATION OF THE NODE AND OPTIONALLY TIME INFORMATION OF THE NODE WITHOUT THE NODE TRANSMITTING ANY TWTR INTERROGATION MESSAGE AND WITHOUT THE NODE TRANSMITTING ANY TWTR RESPONSE MESSAGE

710 — BASED AT LEAST ON AT LEAST ONE OF THE POSITION INFORMATION OF THE NODE OR THE TIME INFORMATION OF THE NODE, AT LEAST ONE OF (A) OUTPUTTING, BY THE NODE, INSTRUCTIONS TO ADJUST COMMUNICATION PARAMETERS, (B) OUTPUTTING, BY THE NODE, INSTRUCTIONS TO ADJUST OPERATIONAL PARAMETERS OF AT LEAST ONE OF AT LEAST ONE SUB-SYSTEM OR AT LEAST ONE SENSOR OF THE NODE, (C) OUTPUTTING, BY THE NODE, INSTRUCTIONS TO DISPLAY AT LEAST ONE GRAPHICAL IMAGE INCLUDING INFORMATION OF THE AT LEAST ONE OF THE POSITION INFORMATION OF THE NODE OR THE TIME INFORMATION OF THE NODE, (D) OUTPUTTING, BY THE NODE, INSTRUCTIONS TO NAVIGATE THE NODE, (E) OUTPUTTING, BY THE NODE, INSTRUCTIONS TO COMMUNICATE WITH AT LEAST ONE NODE, (F) AUTHENTICATING, BY THE NODE, POSITION INFORMATION OBTAINED FROM AT LEAST ONE NAVIGATION SYSTEM, OR (G) AUTHENTICATING, BY THE NODE, TIME INFORMATION OBTAINED FROM AT LEAST ONE TIME SYSTEM, OR (H) OUTPUTTING, BY THE NODE, INSTRUCTIONS TO THE AT LEAST ONE NODE TO SUPPORT CONTROLLING COMMUNICATIONS WITH THE NODE THROUGH THE AT LEAST ONE NODE

FIG.7 Cont.

NODE CONFIGURED TO DETERMINE OWNSHIP POSITION INFORMATION AND/OR OWNSHIP TIME INFORMATION WITHOUT TRANSMITTING TWO-WAY TIMING AND RANGING (TWTR) SIGNALS

BACKGROUND

Currently, two-way timing and ranging (TWTR) involves transmitting interrogation and reply signals between two or more nodes to enable the determination of relative and/or absolute position information and/or the transfer of time information. TWTR involves an ownship node transmitting a TWTR interrogation message as an interrogation signal(s), which is received by one or more additional nodes, and those additional nodes send a TWTR response message as a reply signal(s) to the ownship node's interrogation signal(s).

Currently, the ownship node can determine two-way range by measuring a delta time between a transmission of the interrogation signal and the receipt of the reply signal, by knowing the time delay that each reply node used between receipt of the interrogation signal and the transmission of the reply node's reply signal. Also, as part of the reply signal, if timing information is communicated from the node replying, then the ownship node can determine the time as known by the reply node.

Currently, TWTR may be suitable in some situations to be able to determine time information, determine relative position information, and even determine absolute position information if the position of the reply node is known and either the direction to the reply node is known or there are multiple reply nodes that have communicated their positions. The communication of position by the reply node can be done explicitly as part of the reply signal, or the position of the reply node may be known by the ownship node (e.g., reply node is at fixed position known to the ownship node), or the position of the reply node can be determined or estimated by the ownship node (e.g., reply node position can be predicted using an equations of motion model).

Currently, TWTR can be used to determine precise relative position information, absolute position information, and/or time information of an ownship node, which can be useful in contested environments, whereby, for instance, a global navigation satellite system (GNSS) (e.g., global positioning system (GPS)) or other navigation systems may be denied (e.g., jammed) or may be spoofed.

TWTR transmissions (e.g., both interrogations and replies) can use, for example, signals that have significantly higher power than other navigation signals (like GPS), directional communications, spread spectrum, frequency hopping, etc. and other techniques for robust and efficient communications as well as for positioning and/or time transfer between nodes.

Currently, one problem with TWTR is that it requires radiofrequency (RF) emissions from an ownship node to achieve TWTR benefits (e.g., alternative source of position, navigation, and timing (PNT)). Emitting RF energy (e.g., via interrogation and/or reply signals) to determine and maintain position can be undesirable in contested environments, where hostile forces can more easily detect, identify, locate, and/or target the ownship node. For example, in highly contested environments, the military often wants nodes to operate with Emission Control (EMCON) (e.g., radio silence or very limited emissions). Furthermore, emitting TWTR signals (e.g., interrogations and replies) even in permissive environments (e.g., where GPS is received but TWTR is used for assurance) can lead to unnecessary RF congestion, especially as the number of nodes increases.

SUMMARY

In one aspect, embodiments of the inventive concepts disclosed herein are directed to a system. The system may include a node including at least one radio and at least one processor. The node may be configured to: listen to a first two-way timing and ranging (TWTR) interrogation message and a first TWTR response message communicated between a first pair of nodes during a first time interval, wherein the first TWTR interrogation message indicates position information and optionally time information of one node of the first pair of nodes, wherein the first TWTR response message indicates position information and optionally time information of another node of the first pair of nodes; based at least on the first TWTR interrogation message and the first TWTR response message, determine a first time difference of arrival (TDoA) between the first TWTR interrogation message and the first TWTR response message for the first pair of nodes; based at least on the first TDoA between the first TWTR interrogation message and the first TWTR response message, determine a first boundary of position (BoP); based at least on the first BoP, determine position information of the node and optionally time information of the node without the node transmitting any TWTR interrogation message and without the node transmitting any TWTR response message; and based at least on at least one of the position information of the node or the time information of the node, at least one of (a) output instructions to adjust communication parameters, (b) output instructions to adjust operational parameters of at least one of at least one sub-system or at least one sensor of the node, (c) output instructions to display at least one graphical image including information of the at least one of the position information of the node or the time information of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

In a further aspect, embodiments of the inventive concepts disclosed herein are directed to a method. The method may include: listening, by a node comprising at least one radio and at least one processor, to a first two-way timing and ranging (TWTR) interrogation message and a first TWTR response message communicated between a first pair of nodes during a first time interval, wherein the first TWTR interrogation message indicates position information and optionally time information of one node of the first pair of nodes, wherein the first TWTR response message indicates position information and optionally time information of another node of the first pair of nodes; based at least on the first TWTR interrogation message and the first TWTR response message, determining, by the node, a first time difference of arrival (TDoA) between the first TWTR interrogation message and the first TWTR response message for the first pair of nodes; based at least on the first TDoA between the first TWTR interrogation message and the first TWTR response message, determining, by the node, a first boundary of position (BoP); based at least on the first BoP, determining, by the node, position information of the node and optionally time information of the node without the node transmitting any TWTR interrogation message and without the node transmitting any TWTR response message; and based at least on at least one of the position information of the node or the time information of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7 is a diagram of an exemplary embodiment of a method according to the inventive concepts disclosed herein.

DETAILED DESCRIPTION

Figure 1:
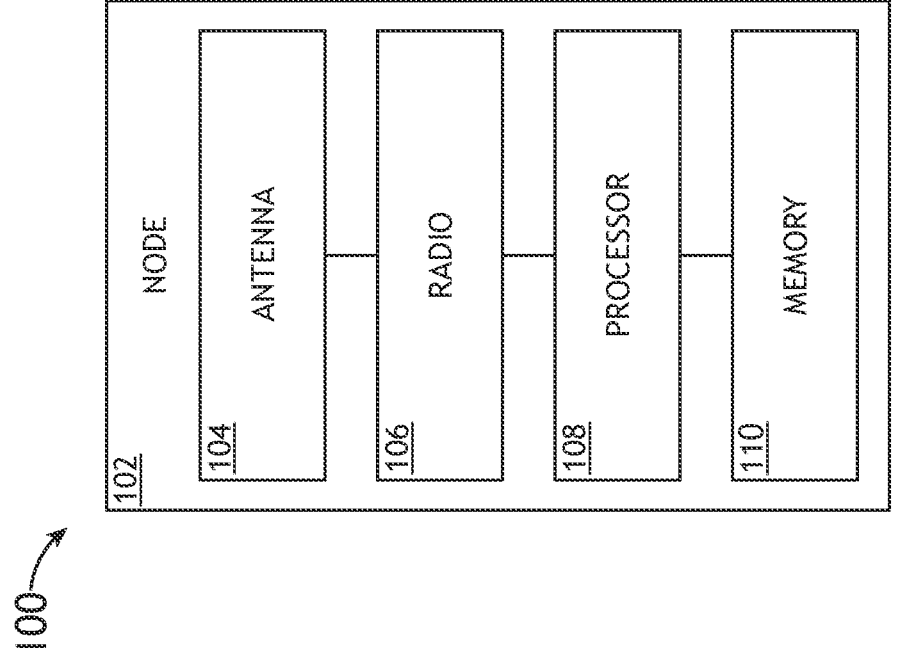
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and they should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a node configured to determine position information of the node and/or time information of the node without the node transmitting any TWTR interrogation message and without the node transmitting any TWTR response message.

Some embodiments may achieve the benefits of TWTR. Some embodiments may determine and/or maintain precise position information and/or time information, such as for nodes in contested environments, without an RF emission from an ownship node. Some embodiments may achieve the benefits of TWTR for all nodes in the network with only two or more nodes in the network transmitting TWTR interrogations and replies.

Some embodiments may include a method and/or a system configured for emission-less TWTR. For example, an ownship node may perform passive TWTR functions without ownship RF emissions such as by listening (e.g., passively listening) to TWTR transmissions from other active TWTR nodes.

In some embodiments, one or more nodes can determine precise position information (e.g., relative and/or absolute position) and time information (e.g., time transfer and/or time synchronization) by listening to active TWTR emissions from other nodes, while the one or more nodes do not emit any TWTR interrogations or replies. Some embodiments enable most of the nodes in the network to determine their own position and time synchronization across a network by listening and processing the information received from a few nodes in the network actively performing TWTR interrogations and replies. Some embodiments may provide a highly advantageous use-case for contested environments, whereby nodes can determine and maintain precise position information and time information without emitting RF energy (via TWTR). For example, most nodes can perform emission-less TWTR using the interrogations and replies of other nodes in the network (which could be positioned outside of the highly contested environment, or within the contested environment as attritable nodes (e.g., low-cost unmanned aerial vehicles (UAVs) with acceptably higher risk of loss tolerance)). For example, some embodiments may be highly advantageous for nodes in a contested environment under Emission Control (EMCON), which is a military state of minimal radio emissions.

In some embodiments, an ownship node may be configured to determine an ownship node position information and time information by listening (e.g., passively listening) to other nodes actively performing TWTR. For example, passively listening may allow the ownship node to avoid transmitting RF emissions (e.g., which may be important for military aircraft in contested environments, where EMCON is often used to avoid detection and targeting; and/or e.g., which may reduce RF congestion in commercial and/or military networks), while still being able to determine position information and/or time information (e.g., which may be especially important if GNSS (e.g., GPS) positioning and/or timing is jammed or otherwise unavailable).

In some embodiments, emission-less TWTR (ETWTR) position and time determination can be used to authenticate GNSS (or other navigation systems) position and/or time determination (e.g., for spoofing detection and mitigation). In some embodiments, ETWTR can be used to maintain position information and/or time information of nodes across a network (e.g., a commercial and/or military network), which may be important for networked communications (e.g., directional, time slotted, authenticated communications, etc.). In some embodiments, ETWTR can significantly reduce the number of active TWTR nodes necessary for TWTR transmissions to maintain network time and positions of the nodes, which may be very important to mitigate the amount of RF bandwidth and/or spectrum resources, power associated with emissions, equipment reliability (e.g., fewer emissions), etc.

Some embodiments may enable military concepts of operations to maintain precise position and time. For example, high value nodes in a contested environment may be configured to remain silent without emitting RF energy while gaining the benefit of determining a position and time of their ownship high value node; TWTR emissions can be limited to nodes in more permissive environments and/or attritable nodes (e.g., relatively lower value nodes compared to the high value nodes) in the contested environment so as to mitigate risk to high value nodes associated with RF emissions. Another possible military concept of operation is where "fragile" nodes, which are more vulnerable to an adversary, may be configured to remain silent without emitting RF energy associated with TWTR emissions while gaining the benefit of determining ownship node position information and time information, while "protected" nodes, which are less susceptible to being disabled or destroyed by the adversary (e.g., due to location outside the contested zone in a more permissive environment, or within the contested zone but fortified with armor or other means of robustness), may be configured for active TWTR emissions.

In some embodiments, an unlimited number of passive ETWTR listener nodes can hear TWTR emissions from two or more active TWTR node pairs (e.g., with suitable geometry relative to the ETWTR listener nodes) such that each of the passive ETWTR listener nodes may be configured to determine own node position information and time information.

In some embodiments, the ownship node may determine its position information and/or time information using a combination of one or more BoPs determined using ETWTR (emission less TWTR listening to one or more node pairs) and/or one or more sets of position and/or time information determined using active TWTR between the ownship node and one or more other nodes.

As used herein, boundary of position (BoP) is defined to be a set of all possible locations on which a node is expected to be located based upon a single set of observations. The intersection of multiple (two or more) boundaries of position obtained from multiple sets of observations can be used to establish a node's location. In some embodiments, the intersection of one or more boundaries of position can be used in combination with other information (e.g., altitude, horizontal position, and/or velocity) about a node to establish a node's location. When used with a navigation state estimator (e.g., Kalman filter, extended Kalman filter, least squares estimator) that takes and weights observations over time, additional node state information in addition to position (e.g., velocity, acceleration, jerk, attitude, and/or altitude) may be determined. BoP is a concept similar to, and often equivalently referred to as, line of position (LOP), which is frequently used in navigation literature. LOP is defined by Merriam-Webster on-line dictionary (viewed on Sep. 27, 2023) as: "a locus of all possible positions of a ship for the conditions given" and "a line along which an aircraft is known (as by ground reference or celestial fix) to be flying and which when crossed with another line of position will establish the precise position of the aircraft." LOP is also defined by Dictionary.com (viewed on Sep. 27, 2023) as: "a line connecting all the possible positions of a ship or aircraft, as determined by a single observation." The term "boundary of position" is being used herein because the standard LOP definitions are too narrowly focused to only determining positions of ships or aircraft, LOP tends to be interpreted as straight lines rather than potentially curved lines (e.g., hyperbolic curves) or curved surfaces, in addition to straight lines, and because the notion of a "single observation" is too constraining for this application since a set of observations from TWTR interrogation and reply messages between two nodes are used to determine one BoP.

As used herein, the term "position information" may refer to information associated with position (which may be in any of various formats, like absolute position relative to an established reference system (e.g., World Geodetic Survey 1984 (WGS-84)), and/or relative position between nodes), and "position information" may include information of one or more other absolute or relative position states of the node, such as velocity, acceleration, and/or jerk.

As used herein, the term "time information" may refer to information associated with time (which may be in any of various formats, like absolute time relative to an established reference system (e.g., Universal Time Coordinated (UTC)), and/or relative time between nodes), and "time information" may include information of one or more other absolute or relative time states of the node, such as time bias, time drift rate, and/or rate of change of time drift rate.

Referring now to FIGS. 1-5, an exemplary embodiment of a system 100 according to the inventive concepts disclosed herein is depicted. The system 100 may be implemented as any suitable system, such as a network (e.g., an RF-based network, a wireless network, a mobile ad hoc network (MANET), a mobile network (e.g., a 4G or a 5G network), or sonar network). The system 100 may include a plurality of nodes 102 (e.g., 102-O (which may refer to an ownship node), 102-A, 102-B, 102-C, and/or 102-D), some or all of which may be communicatively coupled at any given time.

Each node 102 (e.g., 102-O (which may refer to an ownship node), 102-A, 102-B, 102-C, and/or 102-D) may be any suitable node, such as a vehicle (e.g., an aircraft (e.g., a manned aircraft or a UAV (e.g., an attritable UAV)), a watercraft, a submersible craft, an automobile, a spacecraft, a satellite, and/or a train), a manpack, a projectile, mobile device (e.g., a mobile phone and/or a laptop computing device), a building, a structure, a sensor, or a platform (e.g., a radio tower). As shown in FIG. 1, each node 102 may include at least one antenna 104, at least one radio 106 (e.g., at least one software-defined radio (SDR)), at least one processor 108, and/or at least one memory 110, some or all of which may be communicatively coupled at any given time. For example, each radio 106 may be configured to communicate via any suitable waveform(s). In some embodiments, the radio 106 includes one or more of the antennas 104. For example, the at least one radio 106 and/or the at least one antenna 104 may be configured to perform (e.g., collectively perform if more than one radio and/or more than one antenna 104) any or all of the operations disclosed throughout. For example, the at least one processor 108 may be configured to perform (e.g., collectively perform if more than one processor) any or all of the operations disclosed throughout. The at least one processor 108 may be configured to run various software applications or computer code stored (e.g., maintained) in a non-transitory computer-readable medium (e.g., memory 110) and configured to execute various instructions or operations. For example, the at least one processor 108 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 108 may include a CPU and/or an FPGA configured to perform (e.g., collectively perform) any of the operations disclosed throughout.

In some embodiments, the node 102 (e.g., 102-O) may be configured to: listen to a first two-way timing and ranging (TWTR) interrogation message and a first TWTR response message communicated between a first pair of nodes 102 (e.g., 102-A, 102-B, 102-C, and/or 102-D) during a first time interval, wherein the first TWTR interrogation message indicates position information and optionally time information of one node 102 (e.g., 102-A, 102-B, 102-C, or 102-D) of the first pair of nodes 102 (e.g., 102-A, 102-B, 102-C, and/or 102-D), wherein the first TWTR response message indicates position information and optionally time information of another node (e.g., 102-A, 102-B, 102-C, or 102-D) of the first pair of nodes 102 (e.g., 102-A, 102-B, 102-C, and/or 102-D); based at least on the first TWTR interrogation message and the first TWTR response message, determine a first time difference of arrival (TDoA) between the first TWTR interrogation message and the first TWTR response message for the first pair of nodes 102 (e.g., 102-A, 102-B, 102-C, and/or 102-D); based at least on the first TDoA between the first TWTR interrogation message and the first TWTR response message, determine a first boundary of position (BoP) 202; based at least on the first BoP, determine position information of the node 102 (e.g., 102-O) and optionally time information of the node 102 (e.g., 102-O) without the node 102 (e.g., 102-O) transmitting any TWTR interrogation message and without the node 102 (e.g., 102-O) transmitting any TWTR response message; and/or based at least on at least one of the position information of the node 102 (e.g., 102-O) or the time information of the node 102 (e.g., 102-O), at least one of (a) output instructions to adjust communication parameters (e.g., adjust a power gain, steer an electronically scanned array (ESA, such as an active ESA (AESA)) or a directional antenna, and/or adjust frequency), (b) output instructions to adjust operational parameters of at least one of at least one sub-system (e.g., a radar system (e.g., a weather radar system)) or at least one sensor of the node 102 (e.g., 102-O), (c) output instructions to display at least one graphical image including information of the at least one of the position information of the node 102 (e.g., 102-O) or the time information of the node 102 (e.g., 102-O), (d) output instructions to navigate the node 102 (e.g., 102-O), (e) output instructions to communicate with at least one node (e.g., 102-A, 102-B, 102-C, 102-D, and/or at least one other node), (f) authenticate position information obtained from a global navigation satellite system (GNSS) device, (g) authenticate time information obtained from a time system (e.g., a GNSS device), (h) output instructions to the at least one node (e.g., 102-A, 102-B, 102-C, 102-D to support controlling communications with the node 102 (e.g., 102-O) through the at least one node (e.g., 102-A, 102-B, 102-C, 102-D, and/or at least one other node), (i) utilize the position information of the node 102 to compute other information, or (j) utilize the time information of the node 102 to compute additional information.

In some embodiments, the node 102 (e.g., 102-O) may be configured to: listen to a first two-way timing and ranging (TWTR) interrogation message and a first TWTR response message communicated between a first pair of nodes 102 (e.g., 102-A, 102-B, 102-C, and/or 102-D) during a first time interval, wherein the first TWTR interrogation message indicates position information and optionally time information of one node 102 (e.g., 102-A, 102-B, 102-C, or 102-D) of the first pair of nodes 102 (e.g., 102-A, 102-B, 102-C, and/or 102-D), wherein the first TWTR response message indicates position information and optionally time information of another node (e.g., 102-A, 102-B, 102-C, or 102-D) of the first pair of nodes 102 (e.g., 102-A, 102-B, 102-C, and/or 102-D); based at least on the first TWTR interrogation message and the first TWTR response message, determine a first time difference of arrival (TDoA) between the first TWTR interrogation message and the first TWTR response message for the first pair of nodes 102 (e.g., 102-A, 102-B, 102-C, and/or 102-D); based at least on the first TDoA between the first TWTR interrogation message and the first TWTR response message, determine a first boundary of position (BoP) 202; listen to a second TWTR interrogation message and a second TWTR response message communicated between (i) the first pair of nodes 102 (e.g., 102-A, 102-B, 102-C, and/or 102-D) during a second time interval or (ii) a second pair of nodes 102 (e.g., 102-A, 102-B, 102-C, and/or 102-D) during the second time interval, wherein the second TWTR interrogation message indicates position information and optionally time information of one node 102 (e.g., 102-A, 102-B, 102-C, or 102-D) of (i) the first pair of nodes 102 (e.g., 102-A, 102-B, 102-C, and/or 102-D) or (ii) the second pair of nodes 102 (e.g., 102-A, 102-B, 102-C, and/or 102-D), wherein the second TWTR response message indicates position information and optionally time information of another node 102 (e.g., 102-A, 102-B, 102-C, or 102-D) of (i) the first pair of nodes 102 (e.g., 102-A, 102-B, 102-C, and/or 102-D) or (ii) the second pair of nodes 102 (e.g., 102-A, 102-B, 102-C, and/or 102-D); based at least on the second TWTR interrogation message and the second TWTR response message, determine a second TDoA between the second TWTR interrogation message and the second TWTR response message for (i) the first pair of nodes 102 (e.g., 102-A, 102-B, 102-C, and/or 102-D) during the second time interval or (ii) the second pair of nodes 102 (e.g., 102-A, 102-B, 102-C, and/or 102-D); based at least on the second TDoA between the second TWTR interrogation message and the second TWTR response message, determine a second BoP 202; based at least on the first BoP and the second BoP, determine position information of the node 102 (e.g., 102-O) and optionally time information of the node 102 (e.g., 102-O) without the node 102 (e.g., 102-O) transmitting any TWTR interrogation message and without the node 102 (e.g., 102-O) transmitting any TWTR response message; and/or based at least on at least one of the position information of the node 102 (e.g., 102-O) or the time information of the node 102 (e.g., 102-O), at least one of (a) output instructions to adjust communication parameters (e.g., adjust a power gain, steer an electronically scanned array (ESA, such as an active ESA (AESA)) or a directional antenna, and/or adjust frequency), (b) output instructions to adjust operational parameters of at least one of at least one sub-system (e.g., a radar system (e.g., a weather radar system)) or at least one sensor of the node 102 (e.g., 102-O), (c) output instructions to display at least one graphical image including information of the at least one of the position information of the node 102 (e.g., 102-O) or the time information of the node 102 (e.g., 102-O), (d) output instructions to navigate the node 102 (e.g., 102-O), (e) output instructions to communicate with at least one node (e.g., 102-A, 102-B, 102-C, 102-D, and/or at least one other node), (f) authenticate position information obtained from a global navigation satellite system (GNSS) device, (g) authenticate time information obtained from a time system (e.g., a GNSS device), (h) output instructions to the at least one node (e.g., 102-A, 102-B, 102-C, 102-D to support controlling communications with the node 102 (e.g., 102-O) through the at least one node (e.g., 102-A, 102-B, 102-C, 102-D, and/or at least one other node), (i) utilize the position information of the node 102 to compute other information, or (j) utilize the time information of the node 102 to compute additional information.

In some embodiments, when BoPs 202 are determined from TDoA measurements made at different instances in time, where the own node (e.g., 102-O) has moved between the time intervals used to determine the BoPs 202 and to establish own node position at the intersection of the BoPs 202, then the BoPs may be compensated for (e.g., extrapolated) to a common time of applicability using ownship state information (e.g., delta position information) that characterizes the positional movement of the own node (e.g., 102-O) between the different instances in the time of applicability for where the BoP 202 is applicable to the ownship position based upon when the TWTR TDoA measurements were made to establish the BoPs 202. For example, if the own node (e.g., 102-O) does not know its information representative of its delta position information between the times of applicability determined for the BoPs 202, then to mitigate errors in estimating own node position and/or time that may be determined at the intersection of the BoPs, the own node (e.g., 102-O) may mitigate its lack of knowledge of such exemplary delta position by reducing position change during the time periods used to determine the BoPs 202 (e.g., by reducing velocity, such as to zero or near zero velocity) or by reducing elapsed time (e.g., as close to zero elapsed time as practical) between the time intervals.

In some embodiments, the node 102 (e.g., 102-O) may be configured to: based at least on the first TWTR interrogation message, the first TWTR response message, and a first time delay associated with a given TWTR protocol associated with the first TWTR interrogation message and the first TWTR response message, determine the first time difference of arrival (TDoA) between the first TWTR interrogation message and the first TWTR response message for the first pair of nodes 102 (e.g., 102-A, 102-B, 102-C, and/or 102-D); and/or based at least on the second TWTR interrogation message, the second TWTR response message, and a second time delay associated with a particular TWTR protocol associated with the second TWTR interrogation message and the second TWTR response message, determine the second TDoA between the second TWTR interrogation message and the second TWTR response message for (i) the first pair of nodes 102 (e.g., 102-A, 102-B, 102-C, and/or 102-D) during the second time interval or (ii) the second pair of nodes 102 (e.g., 102-A, 102-B, 102-C, and/or 102-D).

In some embodiments, the node 102 (e.g., 102-O) may be configured to: listen to the second TWTR interrogation message and the second TWTR response message communicated between the first pair of nodes 102 (e.g., 102-A, 102-B, 102-C, and/or 102-D) during the second time interval, wherein the second TWTR interrogation message indicates the position information and optionally the time information of one node 102 (e.g., 102-A, 102-B, 102-C, or 102-D) of the first pair of nodes 102 (e.g., 102-A, 102-B, 102-C, and/or 102-D) during the second time interval, wherein the second TWTR response message indicates the position information and optionally the time information of another node 102 (e.g., 102-A, 102-B, 102-C, or 102-D) of the first pair of nodes 102 (e.g., 102-A, 102-B, 102-C, and/or 102-D) during the second time interval; and/or based at least on the second TWTR interrogation message and the second TWTR response message, determine the second TDoA between the second TWTR interrogation message and the second TWTR response message for the first pair of nodes 102 (e.g., 102-A, 102-B, 102-C, and/or 102-D) during the second time interval. In some embodiments, the node 102 (e.g., 102-O) may be configured to: listen to a third TWTR interrogation message and third TWTR response message communicated between (i) the first pair of nodes 102 (e.g., 102-A, 102-B, 102-C, and/or 102-D) during a third time interval or (ii) the second pair of nodes 102 (e.g., 102-A, 102-B, 102-C, and/or 102-D) during the third time interval, wherein the third TWTR interrogation message indicates position information and optionally time information of one node 102 (e.g., 102-A, 102-B, 102-C, or 102-D) of (i) the first pair of nodes 102 (e.g., 102-A, 102-B, 102-C, and/or 102-D) during the third time interval or (ii) the second pair of nodes 102 (e.g., 102-A, 102-B, 102-C, and/or 102-D) during the third time interval, wherein the third TWTR response message indicates position information and optionally time information of another node 102 (e.g., 102-A, 102-B, 102-C, or 102-D) of (i) the first pair of nodes 102

(e.g., 102-A, 102-B, 102-C, and/or 102-D) during the third time interval or (ii) the second pair of nodes 102 (e.g., 102-A, 102-B, 102-C, and/or 102-D) during the third time interval; based at least on the third TWTR interrogation message and the third TWTR response message, determine a third TDoA between the third TWTR interrogation message and the third TWTR response message for (i) the first pair of nodes 102 (e.g., 102-A, 102-B, 102-C, and/or 102-D) during the third time interval or (ii) the second pair of nodes 102 (e.g., 102-A, 102-B, 102-C, and/or 102-D) during the third time interval; based at least on the third TDoA between the third TWTR interrogation message and the third TWTR response message, determine a third BoP 202; and based at least on the first BoP 202, the second BoP 202, and the third BoP 202, determine the position information of the node 102 (e.g., 102-O) and optionally the time information of the node 102 (e.g., 102-O) without the node 102 (e.g., 102-O) transmitting any TWTR interrogation message and without the node 102 (e.g., 102-O) transmitting any TWTR response message. In some embodiments, at least one node 102 (e.g., 102-A, 102-B, 102-C, or 102-D) of the first pair of nodes 102 (e.g., 102-A, 102-B, 102-C, and/or 102-D) is in motion between the first time interval and the second time interval.

In some embodiments, the node 102 (e.g., 102-O) may be configured to: listen to the second TWTR interrogation message and the second TWTR response message communicated between the second pair of nodes 102 (e.g., 102-A, 102-B, 102-C, and/or 102-D) during the second time interval, wherein the second TWTR interrogation message indicates the position information and optionally the time information of one node 102 (e.g., 102-A, 102-B, 102-C, or 102-D) of the second pair of nodes 102 (e.g., 102-A, 102-B, 102-C, and/or 102-D) during the second time interval, wherein the second TWTR response message indicates the position information and optionally the time information of another node 102 (e.g., 102-A, 102-B, 102-C, or 102-D) of the second pair of nodes 102 (e.g., 102-A, 102-B, 102-C, and/or 102-D) during the second time interval; and/or based at least on the second TWTR interrogation message and the second TWTR response message, determine the second TDoA between the second TWTR interrogation message and the second TWTR response message for the second pair of nodes 102 (e.g., 102-A, 102-B, 102-C, and/or 102-D). In some embodiments, the node 102 (e.g., 102-O) may be configured to: listen to a third TWTR interrogation message and third TWTR response message communicated between a third pair of nodes 102 (e.g., 102-A, 102-B, 102-C, and/or 102-D) during a third time interval, wherein the third TWTR interrogation message indicates position information and optionally time information of one node 102 (e.g., 102-A, 102-B, 102-C, or 102-D) of the third pair of nodes 102 (e.g., 102-A, 102-B, 102-C, and/or 102-D) during the third time interval, wherein the third TWTR response message indicates position information and optionally time information of another node 102 (e.g., 102-A, 102-B, 102-C, or 102-D) of the third pair of nodes 102 (e.g., 102-A, 102-B, 102-C, and/or 102-D) during the third time interval; based at least on the third TWTR interrogation message and the third TWTR response message, determine a third TDoA between the third TWTR interrogation message and the third TWTR response message for the third pair of nodes 102 (e.g., 102-A, 102-B, 102-C, and/or 102-D); based at least on the third TDoA between the third TWTR interrogation message and the third TWTR response message, determine a third BoP 202; and/or based at least on the first BoP 202, the second BoP 202, and the third BoP 202, determine the position information of the node 102 (e.g., 102-O) and optionally the time information of the node 102 (e.g., 102-O) without the node 102 (e.g., 102-O) transmitting any TWTR interrogation message and without the node 102 (e.g., 102-O) transmitting any TWTR response message.

In some embodiments, the node 102 (e.g., 102-O) may be configured to iteratively over time: based at least on an additional TWTR interrogation message and an additional TWTR response message communicated during an additional time interval, determine an additional TDoA between the additional TWTR interrogation message and the additional TWTR response message for the first pair of nodes 102 (e.g., 102-A, 102-B, 102-C, and/or 102-D), the second pair of nodes 102 (e.g., 102-A, 102-B, 102-C, and/or 102-D), or an additional pair of nodes 102; based at least on the additional TDoA between the additional TWTR interrogation message and the additional TWTR response message, determine an additional BoP 202; and/or based at least on the first BoP 202, the second BoP 202, and the additional BoP 202, determine the position information of the node 102 (e.g., 102-O) and optionally the time information of the node 102 (e.g., 102-O) without the node 102 (e.g., 102-O) transmitting any TWTR interrogation message and without the node 102 (e.g., 102-O) transmitting any TWTR response message. In some embodiments, the node 102 (e.g., 102-O) may be configured to: determine at least one of: (a) an instantaneous time difference between the node 102 (e.g., 102-O) and any node 102 of the first, second, or additional pairs of nodes 102, (b) a rate of change of the instantaneous time difference between the node the node 102 (e.g., 102-O) and any node 102 of the first, second, or additional pairs of nodes 102, (c) an acceleration of the rate of change of the instantaneous time difference between the node the node 102 (e.g., 102-O) and any node 102 of the first, second, or additional pairs of nodes 102, or (d) a jerk of the rate of change of the instantaneous time difference between the node the node 102 (e.g., 102-O) and any node 102 of the first, second, or additional pairs of nodes 102.

In some embodiments, the node 102 (e.g., 102-O) may be configured to: based at least on the first BoP 202 and the second BoP 202, determine two-dimensional position information of the node 102 (e.g., 102-O) and optionally time information of the node 102 (e.g., 102-O) without the node 102 (e.g., 102-O) transmitting any TWTR interrogation message and without the node 102 (e.g., 102-O) transmitting any TWTR response message.

In some embodiments, the node 102 (e.g., 102-O) may be configured to: based at least on the first BoP 202 and the second BoP 202, determine three-dimensional position information of the node 102 (e.g., 102-O) and optionally time information of the node 102 (e.g., 102-O) without the node 102 (e.g., 102-O) transmitting any TWTR interrogation message and without the node 102 (e.g., 102-O) transmitting any TWTR response message.

In some embodiments, the node 102 (e.g., 102-O) is a vehicle, wherein the node 102 (e.g., 102-O) knows a velocity and/or an altitude of the node 102 (e.g., 102-O).

In some embodiments, at least one node 102 (e.g., 102-O, 102-A, 102-B, 102-C, and/or 102-D) of the node 102 (e.g., 102-O), the first pair of nodes 102 (e.g., 102-A, 102-B, 102-C, and/or 102-D), or the second pair of nodes (e.g., 102-A, 102-B, 102-C, and/or 102-D) is a vehicle.

In some embodiments, the node 102 (e.g., 102-O) is in a contested environment.

In some embodiments, the node 102 (e.g., 102-O) may be configured to: the first TWTR interrogation message and/or the first TWTR response message does not explicitly communicate the position information of the one node and/or the other node of the first pair of nodes (e.g., 102-A, 102-B, 102-C, and/or 102-D), wherein the position information of the one node and/or the other node of the first pair of nodes (e.g., 102-A, 102-B, 102-C, and/or 102-D) is known by the node 102-O based at least on a fixed position of the one node or the other node of the first pair of nodes (e.g., 102-A, 102-B, 102-C, and/or 102-D), a priori knowledge of a motion plan of the one node or the other node of the first pair of nodes (e.g., 102-A, 102-B, 102-C, and/or 102-D), or an estimate based at least on equations of motion.

In some embodiments, the node 102 (e.g., 102-O) may be configured to: based at least on known approximate position information of the node 102 (e.g., 102-O) and at least one of the first BoP 202 or at least one other BoP 202, determine the position information of the node 102 (e.g., 102-O) and optionally the time information of the node 102 (e.g., 102-O) without the node 102 (e.g., 102-O) transmitting any TWTR interrogation message and without the node 102 (e.g., 102-O) transmitting any TWTR response message. In some embodiments, the known approximate position information of the node 102 (e.g., 102-O) is known based at least on at least one of inertial coasting or position information obtained from at least one navigation system (e.g., at least one GNSS device, at least one altimeter, at least one radar, at least one lidar, at least one electro-optical/infrared (EO/IR) sensor, at least one magnetic anomaly, at least one terrain database, at least one distance measuring equipment (DME), at least one tactical air navigation system (TACAN), at least one long-range navigation (LORAN) system, and/or at least one inertial navigation system (e.g., at least one Ring Laser Gyro, at least one Inertial Measurement Unit (IMU), at least one Fiber Optic Gyro (FOG), and/or at least one Micro-Electromechanical System (MEMS)).

In some embodiments, the node 102 (e.g., 102-O) may be configured to: based at least on a measured altitude of the node 102 (e.g., 102-O) and at least one of the first BoP 202 or at least one other BoP 202, determine three-dimensional position information of the node 102 (e.g., 102-O) and optionally the time information of the node 102 (e.g., 102-O) without the node 102 (e.g., 102-O) transmitting any TWTR interrogation message and without the node 102 (e.g., 102-O) transmitting any TWTR response message.

In some embodiments, the system 100 is or includes a network comprising the node 102 (e.g., 102-O) and the first pair of nodes 102 (e.g., 102-A, 102-B, 102-C, and/or 102-D).

In some embodiments, the node 102 (e.g., 102-O) may be configured to: based at least on the first BoP 202 and the second BoP 202, determine at least one of a velocity, an acceleration, a jerk, an attitude, or an altitude of the node 102 (e.g., 102-O) without the node 102 (e.g., 102-O) transmitting any TWTR interrogation message and without the node 102 (e.g., 102-O) transmitting any TWTR response message.

Figure 2:
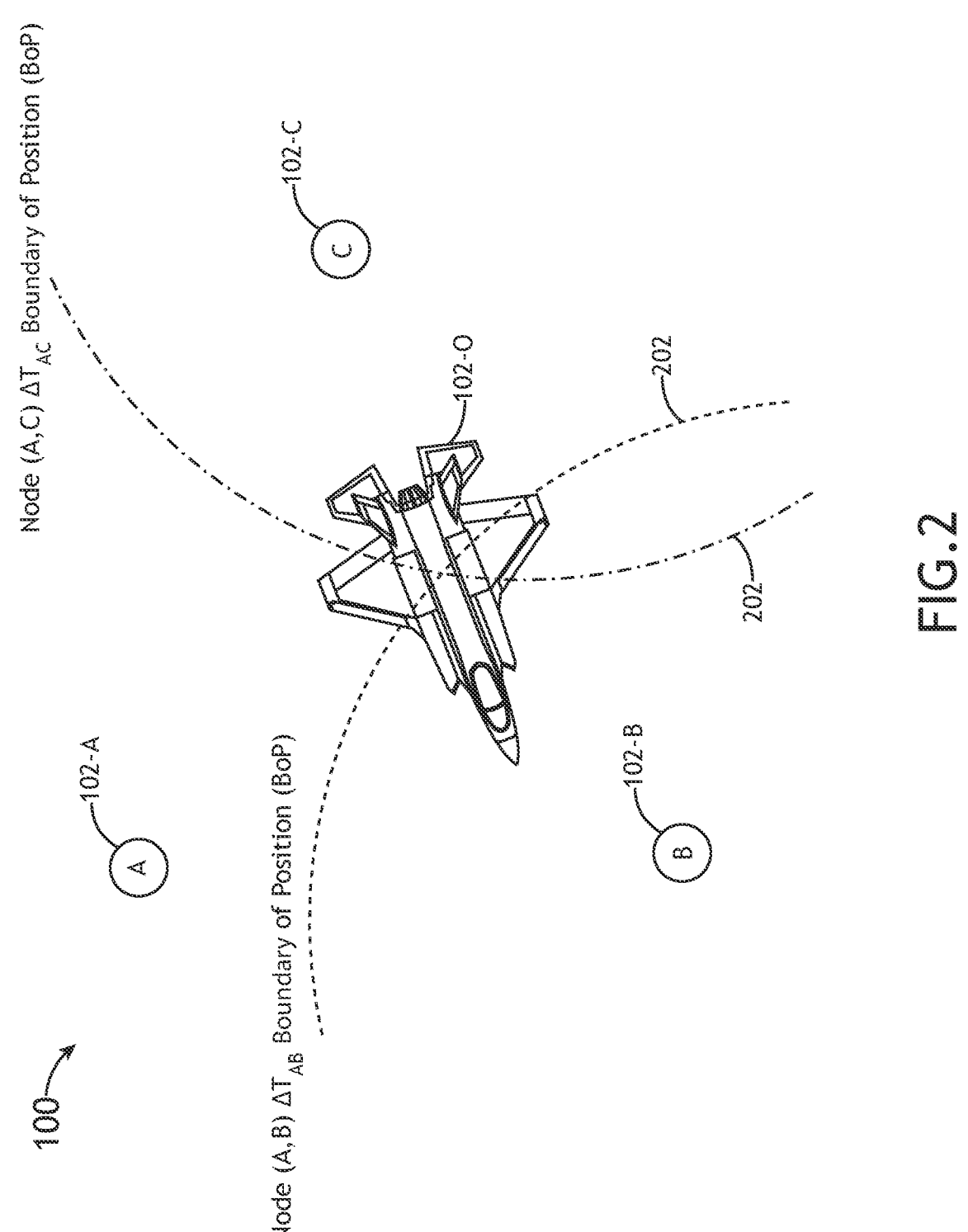
FIG. 2 is a view of an exemplary embodiment of the system of FIG. 1 according to the inventive concepts disclosed herein.

Referring now to FIG. 2, an exemplary embodiment of the system 100 of FIG. 1, according to the inventive concepts disclosed herein, is depicted. As shown, in FIG. 2, the system 100 may include nodes 102-O (which may refer to an ownship node), 102-A, 102-B, and 102-C. In some embodiments, emission-less TWTR (ETWTR) may involve the node 102-O listening (e.g., passively listening) to TWTR emissions from other nodes 102 in the system 100 (e.g., a network) and measuring the TDoA(s). The TDoA of TWTR transmission interrogations and TWTR replies between other node pairs (e.g., two of 102-A, 102-B, or 102-C) in the network (e.g., which may adjust for propagation time between interrogation and reply nodes (e.g., 102-A, 102-B, and/or 102-C), as well as a TWTR protocol-defined reply delay, which may be a fixed delay or variable delay time that can be known or can be determined by the receiving nodes (e.g., 102-A, 102-B, or 102-C)), may identify a unique boundary of position (BoP) 202 for each node pair (e.g., two of 102-A, 102-B, or 102-C) performing TWTR. The node 102-O can determine its position and time at least by measuring the TDoA for multiple node pair TWTR emissions. Position may be determined at least by using multiple BoPs 202 established by the TDoAs, and then time can be determined. Each boundary of position (BoP) 202 may be a line, curve, or geometric shape (e.g., surface of a sphere), identifying all the possible positions of the node 102-O as determined from a single set of observations associated with a TWTR interrogation and corresponding reply.

Figure 5:
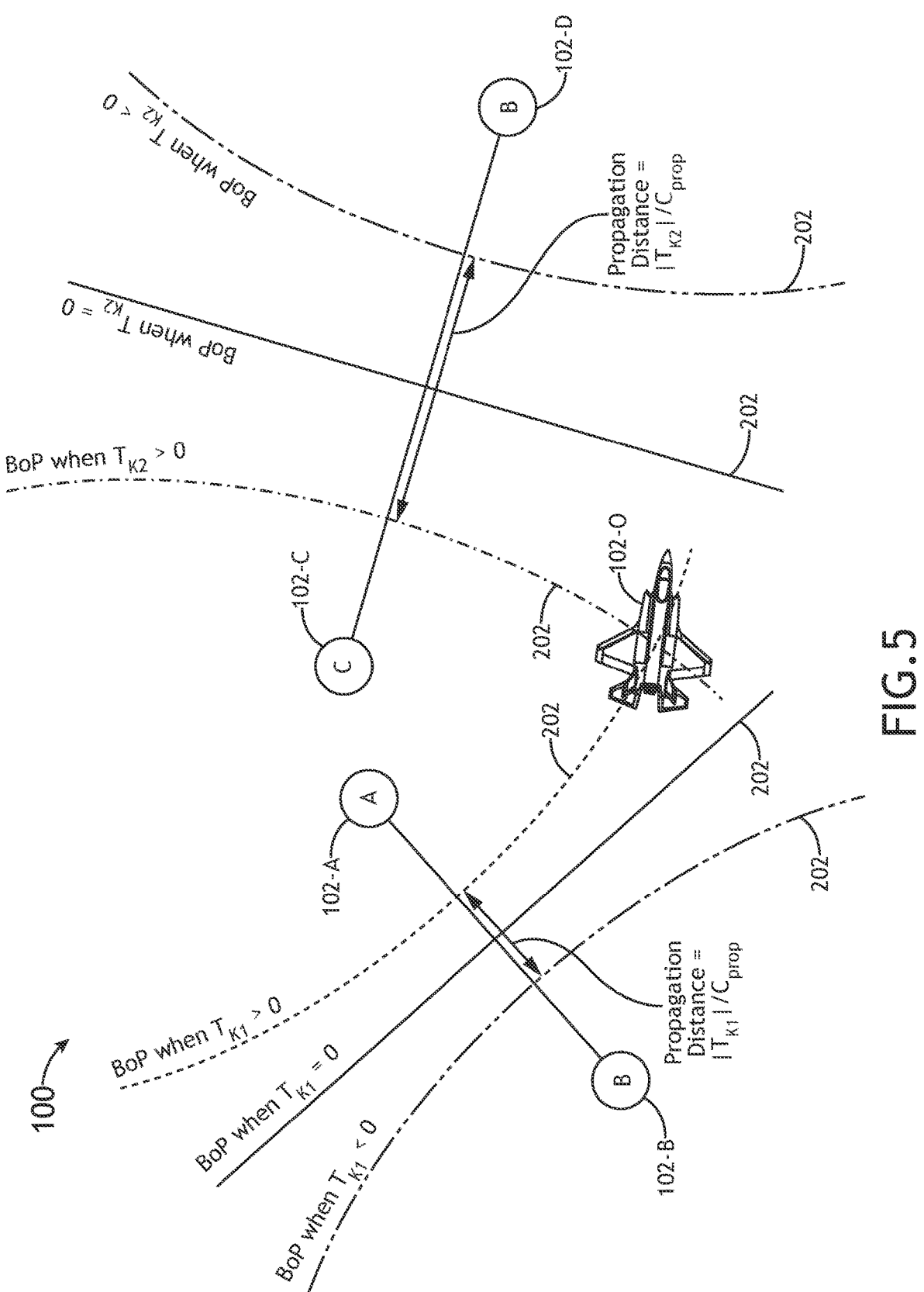
FIG. 5 is a view of an exemplary embodiment of the system of FIG. 1 according to the inventive concepts disclosed herein.

FIG. 2 exemplarily shows two BoPs 202: (a) a first BoP 202 associated with a first pair of nodes 102-A, 102-B performing TWTR; and (b) a second BoP 202 associated with a second pair of nodes 102-A, 102-C performing TWTR. As illustratively shown in FIG. 2, the intersection of the first BoP 202 and the second BoP 202 may indicate (e.g., may identify) the location of the node 102-O. It should be noted that with only two TWTR node pair observations, there may be at least two possible locations for the node 102-O. For example, if there are multiple possible locations, the multiple possible locations can be resolved with additional measurements (e.g., with respect to a third TWTR node pair) or between a same pair (e.g., 102-A, 102-B or 102-A, 102-C) at multiple times presuming movement of at least one node (e.g., 102-A, 102-B, and/or 102-C), or reasonable a-priori approximate known location of the node 102-O position (e.g., from inertial coasting), or other information of the node 102-O (e.g., altitude). Once the node's 102-O position is determined, the TWTR reported node positions and times from the other nodes 102 (e.g., 102-A, 102-B, and/or 102-C) can be used to determine the time offset of the node 102-O to the other nodes 102 (e.g., 102-A, 102-B, and/or 102-C). While FIG. 2 exemplarily depicts one embodiment having two node pairs 102-A, 102-B and 102-A, 102-C formed from three nodes 102-A, 102-B, 102-C, other embodiments may involve any suitable number of node pairs formed of any suitable number of nodes. For example, FIG. 5 shows two node pairs 102-A, 102-B and 102-C, 102-D formed of four nodes 102-A, 102-B, 102-C, 102-D.

Active TWTR nodes (e.g., 102-A, 102-B and 102-C) may report their three-dimensional (3D) position and time as part of the TWTR interrogation and reply protocol. For example, position may be reported in a coordinate frame, like WGS-84 (or equivalent) as well as an altitude (e.g., WGS-84, a pressure altitude or equivalent), where the altitude may support a passive TWTR node 102-O to determine the passive TWTR node's position and time with two active TWTR node pairs (e.g., 102-A, 102-B and 102-C, 102-D).

In some embodiments, a single BoP 202 determined from one observation of one TWTR node pair can be enough to uniquely identify own node position, if at least one component of ownship position (e.g., latitude, longitude, or altitude) is known by the node 102-O, or additionally, for example, one TWTR node pair with multiple observation times (e.g., two or more instances where at least one of either node 102-O or one of the nodes in the TWTR node pair moves between observation times), can be used to establish own node position of the node 102-O.

In some embodiments, multiple BoPs 202 from multiple sets of observations can be used to reduce the number of possible positions of the node 102-O. If there is sufficient information from multiple sets of observations, the position of the node 102-O can be determined. In some cases, where there are insufficient observations to determine the position of the node 102-O, it may be feasible to determine that multiple positions (e.g., two or more positions) are possible. Often, in cases where multiple positions of the node 102-O are determined to be possible based upon the intersection of multiple BoPs 202, other information may be available (e.g., a-priori or known position estimate and/or velocity between observation periods), which can be used to determine which of the possible multiple positions correspond with the actual position of the node 102-O.

In some embodiments, the geometry of the known TWTR nodes relative to the ownship node may be important to reduce own node position determination uncertainty in the presence of observation measurement uncertainties. One can often determine a more accurate position in the presence of observation measurement uncertainties by utilizing more sets of observation measurements (e.g., an overdetermined solution), through an appropriate weighting of the observations in the position determination solution, using weighting functions such as, for example, a Kalman filter, extended Kalman filter, least squares solution, etc.

Figure 3:
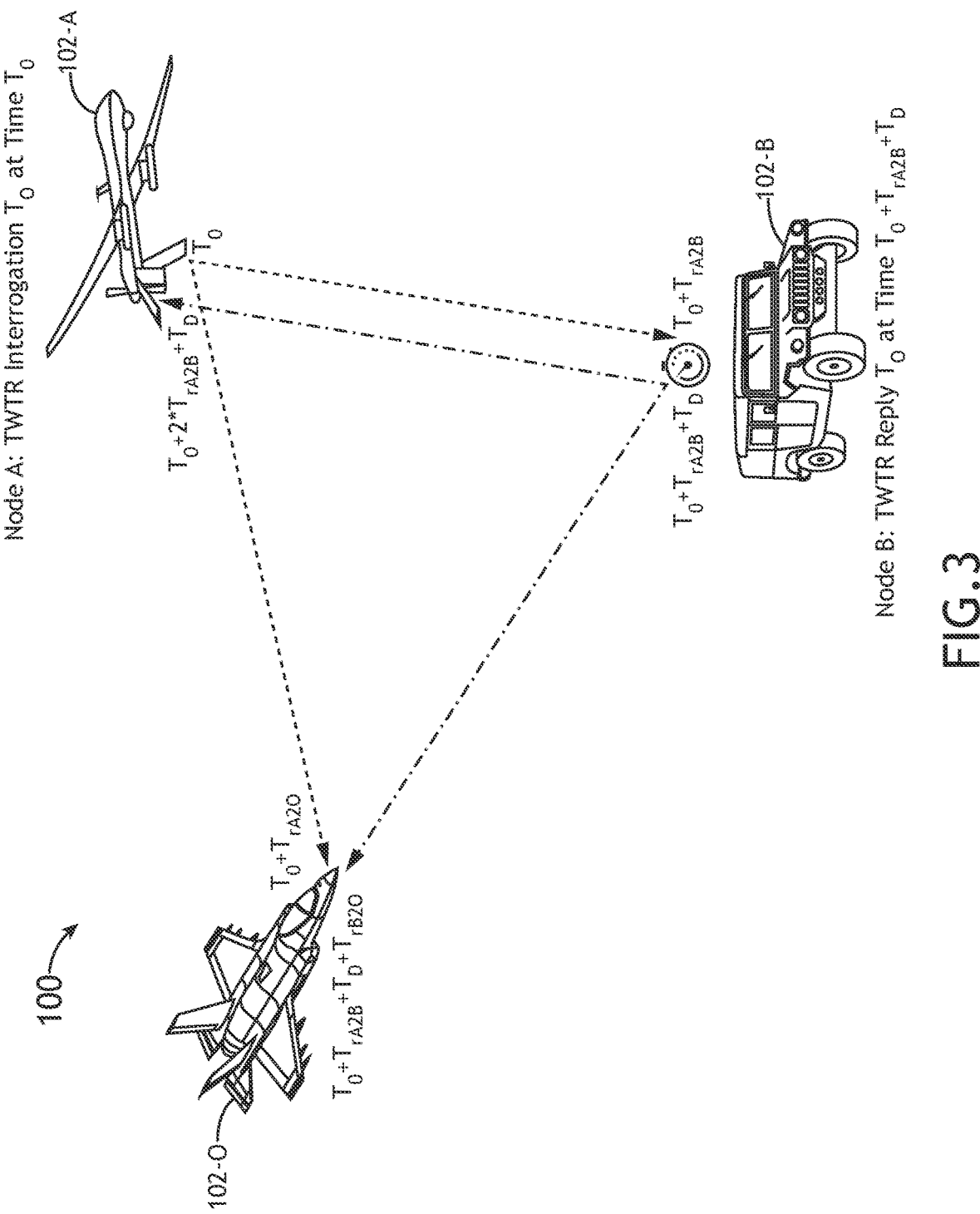
FIG. 3 is a view of an exemplary embodiment of the system of FIG. 1 according to the inventive concepts disclosed herein.
Figure 4:
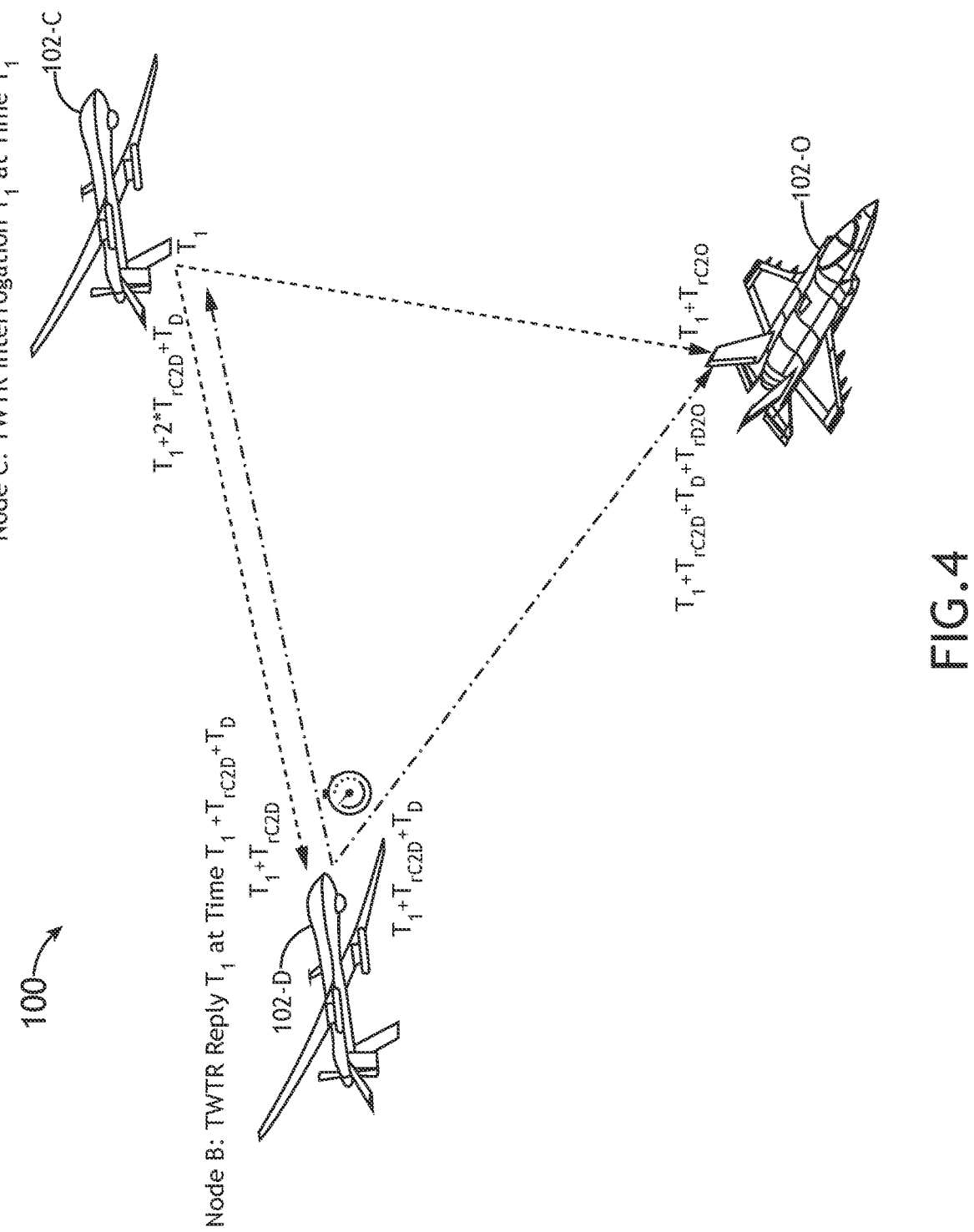
FIG. 4 is a view of an exemplary embodiment of the system of FIG. 1 according to the inventive concepts disclosed herein.

Referring now to FIGS. 3 and 4, an exemplary embodiment of the system 100 of FIG. 1, according to the inventive concepts disclosed herein, is depicted. As shown, in FIGS. 3 and 4, the system 100 may include nodes 102-O (which may refer to an ownship node), 102-A, 102-B, 102-C, and 102-D.

For example, with respect to FIG. 3, the node 102-O may be configured to: listen to a first two-way timing and ranging (TWTR) interrogation message and a first TWTR response message communicated between a first pair of nodes 102-A, 102-B during a first time interval, wherein the first TWTR interrogation message indicates a position and a time of one node 102-A of the first pair of nodes 102-A, 102-B, wherein the first TWTR response message indicates a position and a time of another node 102-B of the first pair of nodes 102-A, 102-B; based at least on the first TWTR interrogation message and the first TWTR response message, determine a first time difference of arrival (TDoA) between the first pair of nodes 102-A, 102-B; and/or based at least on the first TDoA between the first TWTR interrogation message and the first TWTR response message, determine a first boundary of position (BoP) 202.

For example, with respect to FIG. 4, the node 102-O may be configured to: listen to a second TWTR interrogation message and a second TWTR response message communicated between a second pair of nodes 102-C, 102-D during a second time interval, wherein the second TWTR interrogation message indicates a position and a time of one node 102-C of the second pair of nodes 102-C, 102-D, wherein the second TWTR response message indicates a position and a time of another node 102-D of the second pair of nodes 102-C, 102-D; based at least on the second TWTR interrogation message and the second TWTR response message, determine a second TDoA between the second pair of nodes 102-C, 102-D; based at least on the second TDoA between the second TWTR interrogation message and the second TWTR response message, determine a second BoP 202; based at least on the first BoP 202 and the second BoP 202, determine a position of the node 102-O and a time of the node 102-O without the node 102-O transmitting any TWTR interrogation message and without the node 102-O transmitting any TWTR response message; and/or based at least on at least one of the position of the node 102-O or the time of the node 102-O, at least one of (a) output or utilize in another computation, by the node, a position of the node

102-O, (b) output or utilize in another computation, by the node, time information 102-O, (c) output instructions to navigate the node 102-O, (d) output instructions to communicate with at least one node (e.g., 102-A, 102-B, 102-C, 102-D, and/or at least one other node), (e) authenticate a location obtained from a global navigation satellite system (GNSS) device, or (f) authenticate a time obtained from another timing system like a GNSS device.

For example, referring again to FIG. 3, the node 102-O may listen (e.g., passively listen) to TWTR interrogation and reply messages communicated between the first pair of nodes 102-A, 102B.

$T_0$ is the time that node 102-A ("Node A") initiates TWTR Interrogation.

$T_D$ is the time delay between TWTR node reception of interrogation, and TWTR reply.

$T_{rA2B}$ is the time duration for the transmit signal to propagate over the range from Node A to node 102-B ("Node B"), or vice versa.

$T_{rA2O}$ is the time duration for the signal to propagate over the range from Node A to the node 102-O ("Node O").

$T_{rB2O}$ is the time duration for the transmit signal to propagate over the range from Node B to the node 102-O ("Node O").

$T_0+T_{rA2O}$ equals the time when the node 102-O receives the TWTR Interrogation from Node A.

$T_0+T_{rA2B}+T_D+T_{rB2O}$ equals the time when the node 102-O receives the TWTR Reply from Node B.

$\Delta T_{AB}$ equals $(T_0+T_{rA2O})-(T_0+T_{rA2B}+T_D+T_{rB2O})$ which also equals $(T_{rA2O})-(T_{rA2B}+T_D+T_{rB2O})$ after cancelling $T_0$ from the equation, (hereinafter referred to as "Equation 1"), where is $\Delta T_{AB}$ is the time difference between the time when the node 102-O receives the TWTR Interrogation from Node A and the time when the node 102-O receives the TWTR Reply from Node B, Equation 1 has two unknowns relevant to the position of the node 102-O.

The following are known values: $T_D$, known based at least on the TWTR protocol associated with the TWTR interrogation and reply; $T_{ra2B}$, known based at least on communicated positions of Node A and B within the TWTR interrogation and reply; and $\Delta T_{AB}$, which is measured by the node 102-O as a time difference between Node A's interrogation transmission and Node B's reply receipt.

The following are unknown values: $T_{rA2O}$ and $T_{rB2O}$. To cancels from Equation 1, and the value of $T_0$ does not need to be explicitly known or calculated.

The first BOP 202 may be defined by $T_{rB2O}=(T_{rA2O}-T_{K1})$, where:

$$\Delta T_{AB}=(T_{rA2O})-(T_{rA2B}+T_D+T_{rB2O});\ or$$

$$T_{rB2O}=T_{rA2O}-(\Delta T_{AB}+T_{rA2B}+T_D);\ or$$

$$T_{rB2O}=T_{rA2O}-T_{K1},\ \text{where}\ T_{K1}=(\Delta T_{AB}+T_{rA2B}+T_D).$$

For example, referring again to FIG. 4, the node 102-O may listen (e.g., passively listen) to TWTR interrogation and reply messages communicated between the second pair of nodes 102-C, 102-D.

$T_1$ is the time that node 102-C ("Node C") initiates a TWTR Interrogation.

$T_D$ is the time delay between TWTR node reception of interrogation, and TWTR reply.

$T_{rC2D}$ is the time duration for the transmit signal to propagate over the range from Node C to node 102-D ("Node D"), or vice versa.

$T_{rC2O}$ is the time duration for the signal to propagate over the range from Node C to the node 102-O ("Node O").

$T_{rD2O}$ is the time duration for the transmit signal to propagate over the range from Node D to the node 102-O ("Node O").

$T_1 + T_{rC2O}$ equals the time when the node 102-O receives the TWTR Interrogation from Node C.

$T_1 + T_{rC2D} + T_D + T_{rD2O}$ equals the time when the node 102-O receives the TWTR Reply from Node D.

$\Delta T_{CD}$ equals $(T_1 + T_{rC2O}) - (T_1 + T_{rC2D} + T_D + T_{rD2O})$ which also equals $(T_{rC2O}) - (T_{rC2D} + T_D + T_{rD2O})$ after cancelling $T_1$ from the equation, (hereinafter referred to as "Equation 2"), where is $\Delta T_{CD}$ is the time difference between the time when the node 102-O receives the TWTR Interrogation from Node C and the time when the node 102-O receives the TWTR Reply from Node D, Equation 2 has two unknowns relevant to the position of the node 102-O.

The following are known values: $T_D$, known based at least on the TWTR protocol associated with the TWTR interrogation and reply; $T_{rC2D}$, known based at least on communicated positions of Node C and D within the TWTR interrogation and reply; and $\Delta T_{CD}$, which is measured by the node 102-O as a time difference between Node C's interrogation transmission and Node D's reply receipt.

The following are unknown values: $T_{rC2O}$ and $T_{rD2O}$. $T_1$ cancels from Equation 2, and the value of $T_1$ does not need to be explicitly known or calculated.

The second BOP 202 may be defined by $T_{rD2O} = (T_{rC2O} - T_{K2})$, where:

$$\Delta T_{CD} = (T_{rC2O}) - (T_{rC2D} + T_D + T_{rD2O}); \text{ or}$$

$$T_{rD2O} = T_{rC2O} - (\Delta T_{CD} + T_{rC2D} + T_D); \text{ or}$$

$$T_{rD2O} = T_{rC2O} - T_{K2}, \text{ where } T_{K2} = (\Delta T_{CD} + T_{rC2D} + T_D).$$

Referring still to FIGS. 3-4 and to Equations 1 ($\Delta T_{AB} = (T_{rA2O}) - (T_{rA2B} + T_D + T_{rB2O})$) and Equation 2 ($\Delta T_{CD} = (T_{rC2O}) - (T_{rC2D} + T_D + T_{rD2O})$), the four unknown times (e.g., $T_{rA2O}$, $T_{rB2O}$, $T_{rC2O}$, and $T_{rD2O}$) are directly related (e.g., based at least on the speed of radio wave propagation) to the three-dimensional position of the node 102-O. In some embodiments, the node 102-O can use a measured dimensional position value (e.g., at least one horizontal position value, and/or an altitude (e.g., pressure altitude)) to reduce problem solving to a two-dimensional (e.g., horizontal) determination of position of the node 102-O.

The node 102-O may be configured to compute ownship position of the node 102-O, based at least on measurements of the time difference of arrival between TWTR interrogations and replies from two or more node pairs (e.g., 102-A, 102-B and 102-C, 102-D).

When there are two measurements of the time difference of arrival (TDoA) between TWTR interrogations and replies from two node pairs (e.g., 102-A, 102-B and 102-C, 102-D), the node 102-O uses two equations (e.g., Equations 1 and 2) to solve for the unknown ownship position of the node 102-O. This is solvable, since the position of Nodes A, B, C, and D are known (e.g., communicated) with TWTR. In some embodiments, the node 102-O can use ownship altitude to aid the node 102-O position determination process. Similarly, when there are more than two measurements of the time difference of arrival between TWTR interrogations and replies from more than two node pairs, the node 102-O uses more than two equations (e.g., Equations 1, 2, and a similar equation for each additional node pair) to solve for the unknown ownship position of the node 102-O.

Note that with only 2 TDoA measurements, there are two possible locations for the node 102-O. This can be resolved with additional TDoA measurements (e.g., between a third pair of nodes, or between a same pair at multiple times presuming movement of at least one node of A, B, C, D, or the node 102-O, or if there is reasonable a-priori approximate known location of the node 102-O (e.g., from inertial coasting).

The node 102-O can calculate time transfer once the position of the node 102-O is known. Then, when Nodes A, B, C, and/or D communicate time with their TWTR interrogation and/or reply transmissions, the node 102-O can calculate the time of reception based at least on knowing the location of the nodes A, B, C, D, and the node 102-O, determine the node 102-O's clock bias from the clocks on Nodes A, B, C, and/or D. With multiple measurements over time, the node 102-O can estimate clock drift, and other higher order clock states as well.

As set forth within, the node 102-O can determine the 3-dimensional position of the node 102-O, a two-dimensional (e.g., horizontal) position of the node 102-O (e.g., where a vertical position is determined by the node 102-O based at least on use of another positioning system (e.g., an altimeter and/or radar altitude)), a vertical position of the node 102-O (e.g., where a two-dimensional horizontal position is determined by the node 102-O based at least on use of another positioning system), and/or the time of the node 102-O. For example, if the node 102-O uses ETWTR to determine the two-dimensional position of the node 102-O but not the vertical position of the node 102-O, other information can be used to determine the vertical position of the node 102-O (e.g., by use of an altimeter, a radar, a lidar, an electro-optical/infrared (EO/IR) sensor, a magnetic anomaly, a terrain database, and/or etc.). For example, if the node 102-O uses ETWTR to determine the vertical position of the node 102-O but not the horizontal position of the node 102-O, other information may be used to determine the horizontal position (e.g., by use of a distance measuring equipment (DME), tactical air navigation system (TACAN), and/or a long-range navigation (LORAN) system).

The node 102-O may be configured to estimate more than just position of the node 102-O. For example, the node 102-O can estimate other states of the node 102-O as well, including for example, velocity, acceleration, jerk, attitude, altitude, and/or etc.

Once the position of the own node 102-O is determined by the node 102-O, then the timing information provided by active TWTR nodes can be used to determine the own node time difference (e.g., instantaneous time difference). Multiple observations over time can be used to estimate not only the instantaneous time difference, but the additional time (e.g., clock) difference states, including the clock difference rate (i.e., the rate of change of the time difference), and subsequent clock states that are derivatives of the above (e.g., clock difference acceleration, clock difference jerk, etc.).

In some embodiments, solving for a two-dimensional position (with or without time) may require one fewer measurement than solving for a three-dimensional position.

Referring now to FIG. 5, an exemplary embodiment of the system 100 of FIG. 1, according to the inventive concepts disclosed herein, is depicted. As shown, in FIG. 5, the system 100 may include nodes 102-O (which may refer to an ownship node), 102-A, 102-B, 102-C, and 102-D. As shown, exemplary illustrations of possible first BoPs 202 between the first node pair 102-A, 102-B and the node 102-O and possible second BoPs 202 between the second node pair 102-C, 102-D and the node 102-O.

For example, as shown in FIG. 5, exemplary illustrations of possible first BoPs 202 between the first node pair 102-A, 102-B and the node 102-O are shown. In accordance with the equation of $T_{K1}=(\Delta T_{AB}+T_{rA2B}+T_D)$, when $T_{K1}>0$, the node 102-O is closer to Node A than Node B; when $T_{K1}=0$, the node 102-O is the same distance from Node A and Node B; and when $T_{K1}<0$, the node 102-O is closer to Node B than Node A. When $T_{K1}$ is non-zero, the distance that the node 102-O is closer to the Node A or Node B may be computed as $|T_{K1}|/C_{prop}$, where "||" indicates the absolute value, and where $C_{prop}$ is the propagation speed of the signal, which would typically be at or near the speed of light for propagation through the atmosphere on earth or approximately 186,000 miles per second.

For example, as shown in FIG. 5, exemplary illustrations of possible second BoPs 202 between the second node pair 102-C, 102-D and the node 102-O are shown. In accordance with the equation of $T_{K2}=(\Delta T_{CD}+T_{rC2D}+T_D)$, when $T_{K2}>0$, the node 102-O is closer to Node C than Node D; when $T_{K2}=0$, the node 102-O is the same distance from Node C and Node D; and when $T_{K2}<0$, the node 102-O is closer to Node D than Node C. When $T_{K2}$ is non-zero, the distance that the node 102-O is closer to the Node C or Node D may be computed as $|T_{K2}|/C_{prop}$, where "||" indicates the absolute value, and where $C_{prop}$ is the propagation speed of the signal, which would typically be at or near the speed of light for propagation through the atmosphere on earth.

In some embodiments, the BoP(s) 202 may be hyperbolic when $T_{K1}$ and/or $T_{K2}$ is non-zero, based upon adjusted TDoA of Interrogation and Reply TWTR signals.

As exemplarily shown and described throughout, Nodes C and D can be unique, or Nodes C and D could be Nodes A and B at another time, or they could be reuse one of the Nodes A and B and have a unique $3^{rd}$ Node, etc.

Figure 6:
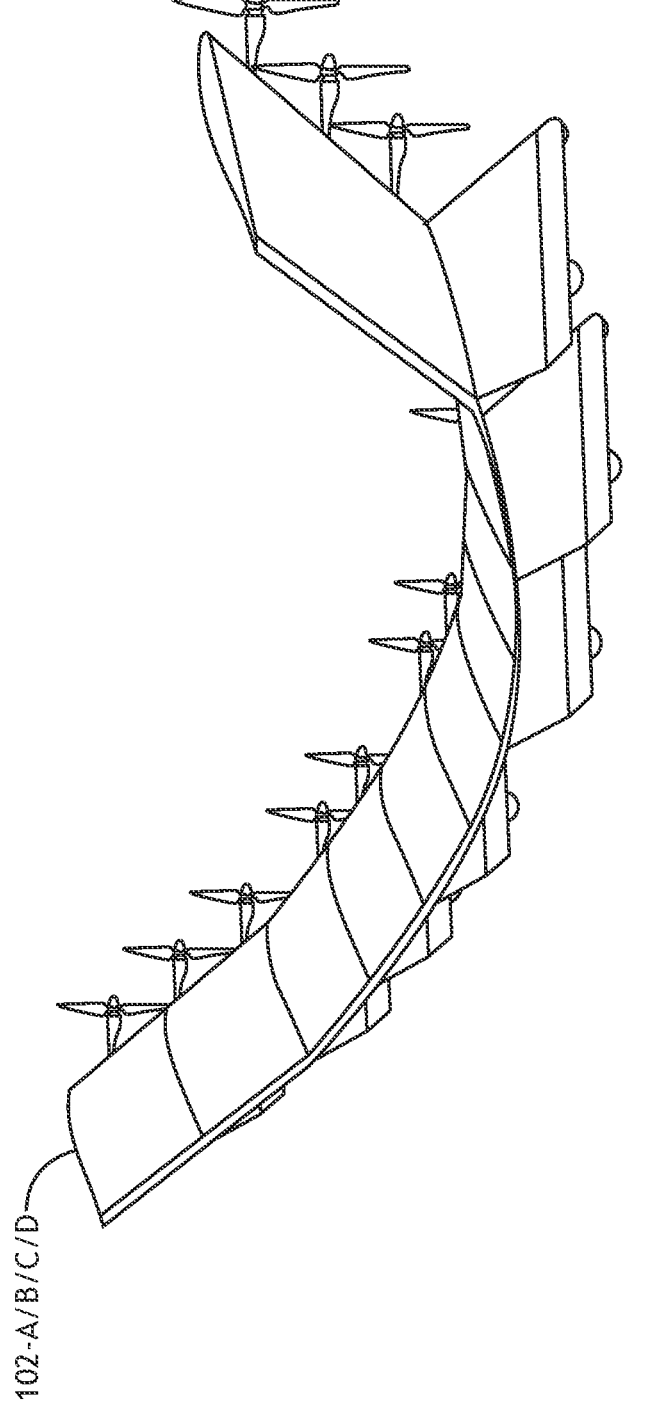
FIG. 6 is a view of an exemplary embodiment of the system of FIG. 1 according to the inventive concepts disclosed herein.

Referring now to FIG. 6, an exemplary embodiment of the system 100 of FIG. 1 including an exemplary node 102-A, 102-B, 102-C, or 102-D, according to the inventive concepts disclosed herein, is depicted.

Some embodiments may have civil (e.g., commercial) applications that allow for providing positioning, navigation, and time (PNT) services over a local area to meet specific mission needs (e.g., of an airport or mining operation, over a narrow region (e.g., over the Grand Canyon as a navigation aide in terrain challenged areas), over a wide region (e.g., state or multi-state), country wide (e.g., over the entire United States), or over larger areas to include the entire world and beyond (e.g., moon, solar system, deep space, etc.)).

For example, as shown in FIG. 6, one such application is to field multiple nodes 102-A, 102-B, 102-C, and/or 102-D as High-Altitude Platform Systems (HAPS), which may loiter at high altitude above the earth (e.g., in the stratosphere at approximately 60,000 feet) for extended periods of time (e.g., months to years in duration), such that the HAPS nodes 102-A, 102-B, 102-C, and/or 102-D actively perform TWTR between HAPS nodes 102-A, 102-B, 102-C, and/or 102-D and/or between HAPS nodes 102-A, 102-B, 102-C, and/or 102-D and other airborne or ground nodes. As part of their TWTR protocol, the HAPS nodes 102-A, 102-B, 102-C, and/or 102-D may transmit their precise position, and the TWTR signals could be used for a wide range of military and/or civil PNT applications (e.g., as well as communications, surveillance, atmospheric sensing, environmental sensing, etc.).

For example, HAPS aircraft may be built for long duration and high-altitude flight. Such HAPS aircraft may be used for the active TWTR nodes to provide a large coverage footprint.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include listening, by a node comprising at least one radio and at least one processor, to a first two-way timing and ranging (TWTR) interrogation message and a first TWTR response message communicated between a first pair of nodes during a first time interval, wherein the first TWTR interrogation message indicates position information and optionally time information of one node of the first pair of nodes, wherein the first TWTR response message indicates position information and optionally time information of another node of the first pair of nodes.

A step 704 may include based at least on the first TWTR interrogation message and the first TWTR response message, determining, by the node, a first time difference of arrival (TDoA) between the first TWTR interrogation message and the first TWTR response message for the first pair of nodes.

A step 706 may include based at least on the first TDoA between the first TWTR interrogation message and the first TWTR response message, determining, by the node, a first boundary of position (BoP).

A step 708 may include based at least on the first BoP, determining, by the node, position information of the node and optionally time information of the node without the node transmitting any TWTR interrogation message and without the node transmitting any TWTR response message.

A step 710 may include based at least on at least one of the position information of the node or the time information of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

Further, the method 700 may include any of the operations disclosed throughout.

As will be appreciated from the above, embodiments of the inventive concepts disclosed herein may be directed to a method and a system including a node configured to determine a position of the node and/or a time of the node without the node transmitting any TWTR interrogation message and without the node transmitting any TWTR response message.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a node comprising at least one radio and at least one processor, the node configured to:
listen to a first two-way timing and ranging (TWTR) interrogation message and a first TWTR response message communicated between a first pair of nodes during a first time interval, wherein the first TWTR interrogation message indicates position information and optionally time information of one node of the first pair of nodes, wherein the first TWTR response message indicates position information and optionally time information of another node of the first pair of nodes;
based at least on the first TWTR interrogation message and the first TWTR response message, determine a first time difference of arrival (TDoA) between the first TWTR interrogation message and the first TWTR response message for the first pair of nodes;
based at least on the first TDoA between the first TWTR interrogation message and the first TWTR response message, determine a first boundary of position (BoP);
based at least on the first BoP, determine position information of the node and optionally time information of the node without the node transmitting any TWTR interrogation message and without the node transmitting any TWTR response message; and
based at least on at least one of the position information of the node or the time information of the node, at least one of (a) output instructions to adjust communication parameters, (b) output instructions to adjust operational parameters of at least one of at least one sub-system or at least one sensor of the node, (c) output instructions to display at least one graphical image including information of the at least one of the position information of the node or the time information of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

2. The system of claim 1, wherein the node is further configured to:
listen to a second TWTR interrogation message and a second TWTR response message communicated between (i) the first pair of nodes during a second time interval or (ii) a second pair of nodes during the second time interval, wherein the second TWTR interrogation message indicates position information and optionally time information of one node of (i) the first pair of nodes or (ii) the second pair of nodes, wherein the second TWTR response message indicates position information and optionally time information of another node of (i) the first pair of nodes or (ii) the second pair of nodes;
based at least on the second TWTR interrogation message and the second TWTR response message, determine a second TDoA between the second TWTR interrogation message and the second TWTR response message for (i) the first pair of nodes during the second time interval or (ii) the second pair of nodes; and
based at least on the second TDoA between the second TWTR interrogation message and the second TWTR response message, determine a second BoP;
wherein the node being configured to, based at least on the first BoP, determine the position information of the node and optionally the time information of the node without the node transmitting any TWTR interrogation message and without the node transmitting any TWTR response message further comprises the node being configured to:

based at least on the first BoP and the second BoP, determine the position information of the node and optionally the time information of the node without the node transmitting any TWTR interrogation message and without the node transmitting any TWTR response message.

3. The system of claim 2, wherein the node is further configured to:

based at least on the first TWTR interrogation message, the first TWTR response message, and a first time delay associated with a given TWTR protocol associated with the first TWTR interrogation message and the first TWTR response message, determine the first TDoA between the first TWTR interrogation message and the first TWTR response message for the first pair of nodes; and based at least on the second TWTR interrogation message, the second TWTR response message, and a second time delay associated with a particular TWTR protocol associated with the second TWTR interrogation message and the second TWTR response message, determine the second TDoA between the second TWTR interrogation message and the second TWTR response message for (i) the first pair of nodes during the second time interval or (ii) the second pair of nodes.

4. The system of claim 2, wherein the node is further configured to:

listen to the second TWTR interrogation message and the second TWTR response message communicated between the first pair of nodes during the second time interval, wherein the second TWTR interrogation message indicates the position information and optionally the time information of one node of the first pair of nodes during the second time interval, wherein the second TWTR response message indicates the position information and optionally the time information of another node of the first pair of nodes during the second time interval; and based at least on the second TWTR interrogation message and the second TWTR response message, determine the second TDoA between the second TWTR interrogation message and the second TWTR response message for the first pair of nodes during the second time interval.

5. The system of claim 4, wherein the node is further configured to:

listen to a third TWTR interrogation message and third TWTR response message communicated between (i) the first pair of nodes during a third time interval or (ii) the second pair of nodes during the third time interval, wherein the third TWTR interrogation message indicates position information and optionally time information of one node of (i) the first pair of nodes during the third time interval or (ii) the second pair of nodes during the third time interval, wherein the third TWTR response message indicates position information and optionally time information of another node of (i) the first pair of nodes during the third time interval or (ii) the second pair of nodes during the third time interval;

based at least on the third TWTR interrogation message and the third TWTR response message, determine a third TDoA between the third TWTR interrogation message and the third TWTR response message for (i)

the first pair of nodes during the third time interval or (ii) the second pair of nodes during the third time interval;

based at least on the third TDoA between the third TWTR interrogation message and the third TWTR response message, determine a third BoP; and based at least on the first BoP, the second BoP, and the third BoP, determine the position information of the node and optionally the time information of the node without the node transmitting any TWTR interrogation message and without the node transmitting any TWTR response message.

6. The system of claim 4, wherein at least one node of the first pair of nodes is in motion between the first time interval and the second time interval.

7. The system of claim 2, wherein the node is further configured to:

listen to the second TWTR interrogation message and the second TWTR response message communicated between the second pair of nodes during the second time interval, wherein the second TWTR interrogation message indicates the position information and optionally the time information of one node of the second pair of nodes during the second time interval, wherein the second TWTR response message indicates the position information and optionally the time information of another node of the second pair of nodes during the second time interval; and based at least on the second TWTR interrogation message and the second TWTR response message, determine the second TDoA between the second TWTR interrogation message and the second TWTR response message for the second pair of nodes.

8. The system of claim 7, wherein the node is further configured to:

listen to a third TWTR interrogation message and third TWTR response message communicated between a third pair of nodes during a third time interval, wherein the third TWTR interrogation message indicates position information and optionally time information of one node of the third pair of nodes during the third time interval, wherein the third TWTR response message indicates position information and optionally time information of another node of the third pair of nodes during the third time interval;

based at least on the third TWTR interrogation message and the third TWTR response message, determine a third TDoA between the third TWTR interrogation message and the third TWTR response message for the third pair of nodes;

based at least on the third TDoA between the third TWTR interrogation message and the third TWTR response message, determine a third BoP; and based at least on the first BoP, the second BoP, and the third BoP, determine the position information of the node and optionally the time information of the node without the node transmitting any TWTR interrogation message and without the node transmitting any TWTR response message.

9. The system of claim 2, wherein the node is further configured to iteratively over time:

based at least on an additional TWTR interrogation message and an additional TWTR response message communicated during an additional time interval, determine an additional TDoA between the additional TWTR interrogation message and the additional TWTR response message for the first pair of nodes, the second pair of nodes, or an additional pair of nodes;

based at least on the additional TDoA between the additional TWTR interrogation message and the additional TWTR response message, determine an additional BoP;

based at least on the first BoP, the second BoP, and the additional BoP, determine the position information of the node and optionally the time information of the node without the node transmitting any TWTR interrogation message and without the node transmitting any TWTR response message.

10. The system of claim 9, wherein the node is further configured to: determine at least one of: (a) an instantaneous time difference between the node and any node of the first, second, or additional pairs of nodes, (b) a rate of change of the instantaneous time difference between the node and any node of the first, second, or additional pairs of nodes, (c) an acceleration of the rate of change of the instantaneous time difference between the node and any node of the first, second, or additional pairs of nodes, or (d) a jerk of the rate of change of the instantaneous time difference between the node and any node of the first, second, or additional pairs of nodes.

11. The system of claim 2, wherein the node is further configured to:

based at least on the first BoP and the second BoP, determine two-dimensional position information of the node and optionally time information of the node without the node transmitting any TWTR interrogation message and without the node transmitting any TWTR response message.

12. The system of claim 2, wherein the node is further configured to:

based at least on the first BoP and the second BoP, determine three-dimensional position information of the node and optionally the time information of the node without the node transmitting any TWTR interrogation message and without the node transmitting any TWTR response message.

13. The system of claim 1, wherein the node knows a velocity, an altitude, and/or a horizontal position of the node.

14. The system of claim 1, wherein the first TWTR interrogation message and/or the first TWTR response message does not explicitly communicate the position information of the one node and/or the other node of the first pair of nodes, wherein the position information of the one node and/or the other node of the first pair of nodes is known by the node based at least on a fixed position of the one node or the other node of the first pair of nodes, a priori knowledge of a motion plan of the one node or the other node of the first pair of nodes, or an estimate based at least on equations of motion.

15. The system of claim 1, wherein the node is further configured to: based at least on known approximate position information of the node and at least one of the first BoP or at least one other BoP, determine the position information of the node and optionally the time information of the node without the node transmitting any TWTR interrogation message and without the node transmitting any TWTR response message.

16. The system of claim 15, wherein the known approximate position information of the node is known based at least on at least one of inertial coasting or position information obtained from at least one navigation system.

17. The system of claim 1, wherein the node is further configured to: based at least on a measured altitude of the node and at least one of the first BoP or at least one other BoP, determine three-dimensional position information of the node and optionally the time information of the node without the node transmitting any TWTR interrogation message and without the node transmitting any TWTR response message.

18. The system of claim 1, further comprising a network comprising the node and the first pair of nodes.

19. The system of claim 2, wherein the node is further configured to: based at least on the first BoP and the second BoP, determine at least one of a velocity, an acceleration, a jerk, an attitude, or an altitude of the node without the node transmitting any TWTR interrogation message and without the node transmitting any TWTR response message.

20. A method, comprising:

listening, by a node comprising at least one radio and at least one processor, to a first two-way timing and ranging (TWTR) interrogation message and a first TWTR response message communicated between a first pair of nodes during a first time interval, wherein the first TWTR interrogation message indicates position information and optionally time information of one node of the first pair of nodes, wherein the first TWTR response message indicates position information and optionally time information of another node of the first pair of nodes;

based at least on the first TWTR interrogation message and the first TWTR response message, determining, by the node, a first time difference of arrival (TDoA) between the first TWTR interrogation message and the first TWTR response message for the first pair of nodes;

based at least on the first TDoA between the first TWTR interrogation message and the first TWTR response message, determining, by the node, a first boundary of position (BoP);

based at least on the first BoP, determining, by the node, position information of the node and optionally time information of the node without the node transmitting any TWTR interrogation message and without the node transmitting any TWTR response message; and based at least on at least one of the position information of the node or the time information of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the at least one of the position information of the node or the time information of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

* * * * *